United States Patent [19]

Hartmann

[11] 4,048,492
[45] Sept. 13, 1977

[54] METHOD AND APPARATUS FOR AUTOMATIC FOCUSING AN OPTICAL SYSTEM WITH A SCANNING GRATING

[75] Inventor: Horst Hartmann, Nauborn, Germany

[73] Assignee: Ernst Leitz GmbH, Wetzlar, Germany

[21] Appl. No.: 695,916

[22] Filed: June 14, 1976

[30] Foreign Application Priority Data

June 26, 1975 Germany ............................ 2528515

[51] Int. Cl.$^2$ ............................................. G01J 1/20
[52] U.S. Cl. ................. 250/201; 250/237 G; 350/162 SF
[58] Field of Search ............... 250/201, 237 G, 550; 356/4, 28, 162 SF

[56] References Cited

U.S. PATENT DOCUMENTS

| | | | |
|---|---|---|---|
| 3,781,110 | 12/1973 | Leitz et al. .................. | 356/4 |
| 3,856,401 | 12/1974 | Heitmann et al. ............ | 356/28 |
| 3,917,409 | 11/1975 | Kaestner ....................... | 356/4 X |
| 3,972,021 | 7/1976 | Leitz et al. ................... | 250/237 G X |

*Primary Examiner*—Rudolph V. Rolinec
*Assistant Examiner*—Vincent J. Sunderdick
*Attorney, Agent, or Firm*—Gilbert L. Wells

[57] ABSTRACT

Method and apparatus for automatically focusing an optical system, particularly a microscope. A grating is located in the intermediate image plane and acts as a spatial frequency filter. A photoelectric detection system is associated with the grating. Electrical control signals are generated which are modulated by the relative motion between the object image and the grating. This motion is preferably normal to the longitudinal range of the grating marks. The grating used is short compared to the range of the intermediate image. The relative motions extending across several grating constants are generated between the image and the grating.

2 Claims, 4 Drawing Figures

METHOD AND APPARATUS FOR AUTOMATIC FOCUSING AN OPTICAL SYSTEM WITH A SCANNING GRATING

CROSS REFERENCES TO RELATED APPLICATIONS

Applicant claims priority under 35 U.S.C. 119 for Application P 25 28 515.8, filed June 26, 1975 in the Patent Office of the Federal Republic of Germany.

The disclosure of the application of Werner Holle and Walter Bletz, entitled "Scanning Grating for a Focus Detector" and filed on the same day as the present application is incorporated herein to show the state of the art of scanning gratings.

BACKGROUND OF THE INVENTION

The present invention relates to a method for automatically focusing an optical system, especially a microscope, making use of a scanning grating, and to the apparatus for implementing this method.

It is known to automatically focus optical apparati by mounting a scanning grating (sensor) in the image plane of the system and acting as a spatial frequency filter, the spatial freqeuncy corresponding to the grating constant being filtered out of the intermediate image and being used through the intermediary of a photodetector to generate electrical signals. The grating in this method is moved over the intermediate image, and different signals depending on the focus or lack of it in the system are obtained which represent a criterion for the required focus adjustment.

The state of the art of focusing detectors and the gratings useful therein may be ascertained by reference to U.S. Pat. No. 3,781,110, the disclosure of which is incorporated herein.

New sites are found, especially in microscopes, for which the sensor can generate only a small signal, or virtually none, when the grating is made to oscillate only across a few grating constants or when the microscope object is displaced, so that focusing is impossible at those sites, or even defocusing takes place. In a manner escaping the naked eye, these sites of the preparations are characterized in that the light fluxes measured by the two photodetectors are equal when a prismatic grating is used as the scanning grating, or in other words, the spatial frequency corresponding to the scanning grating cannot be detected in the object for the particular present relative motion between object and grating. The second formulation also applies to amplitude gratings operating as scanning gratings. Good signals may occur for a fairly small displacement of the intermediate image.

Even though this phenomenon is found in the automatic focusing of microscopes, it must necessarily also occur in the focusing of other optical apparati, for instance in self-focusing photographic cameras.

The state of the art of automatic microscope focusing devices may be ascertained by reference to U.S. Pat. Nos. 3,731,827 and 3,798,449 the disclosures of which are incorporated herein.

SUMMARY OF THE INVENTION

Having in mind the limitations of the prior art, it is an object of the present invention to provide a method and apparatus for overcoming these difficulties at the object sites providing nearly no signals.

This object is achieved by the present invention by generating relative motions between intermediate image and grating spanning several grating constants and using a grating which is short with respect to the range of the intermediate image.

According to the prior art, it was felt sufficient to let the grating oscillate by one-half a grating period, or hardly more, obtaining thus only the fundamental and the first harmonic waves. In contrast, it is now proposed to extend the scanning path of the grating to about 20 grating periods. This large amplitude of oscillation has the advantage of successively scanning image sites of low and of large signals, a spatial signal being obtained in any event, and so to speak, the locations without signals are skipped over.

The apparatus used to implement the method is a grating that is short with respect to the range of the intermediate image, the drive means for the motion of the grating is of such dimensions that the grating is made to move over several grating constants.

BRIEF DESCRIPTION OF THE DRAWINGS

The drawings appended hereto show an embodiment of the present invention, in which the grating carries out a reciprocating motion.

DESCRIPTION OF THE PREFERRED EMBODIMENTS

Figure 1:
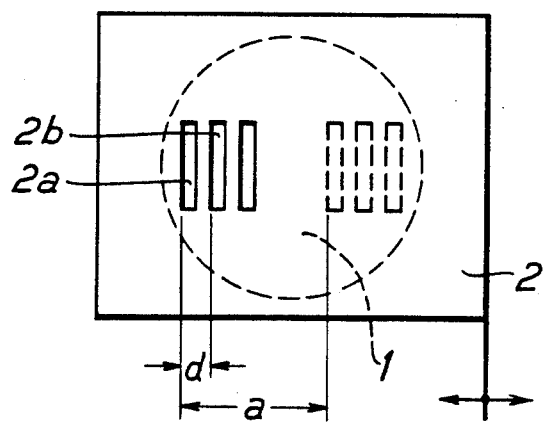
FIG. 1 is a diagrammatic view of the intermediate image with superposed grating, in elevation.

FIG. 1 shows intermediate image 1 and a grating 2 which oscillates in the plane of this image. The actual grating, that is slits 2a and ledges 2b, is short compared to the range of oscillation of the grating. The grating constant is $d$, and the amplitude of oscillation is $a$, and $a >> d$.

Because image sites of different overall brightness are generally swept by the grating, the signal frequency modulated by the frequency of oscillation of the grating is obtained. Because there is a fairly large gap in frequencies because $a >> d$, electrical separation is easy.

In order to restrict the frequency spectrum generated by the motion of the grating, which ordinarily is sinusoidal, and to exclude any possible sources of error and to achieve a more favorable electronic data processing, it is possible to blank out the signals from the grating reversal points and their vicinities by means of a signal obtained from the grating motion. In this manner it is possible to restrict the measurement signal to that range of the overall grating amplitude in which the motion is roughly linear.

Figure 2:
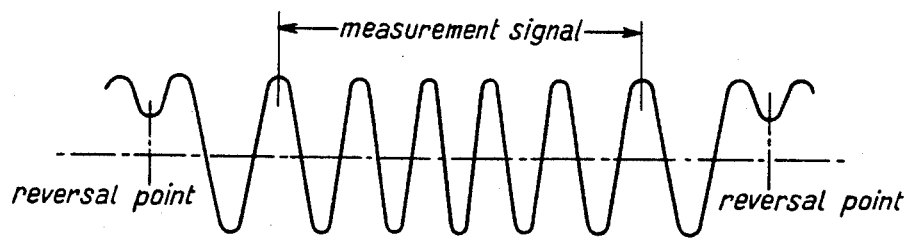
FIG. 2 is a graphical representation of an ideal signal, typical for an oscillating grating when all objects sites are sufficiently bright.

FIG. 2 shows the signal for an object site of constant brightness along the entire grating excursion. The signal amplitudes are all equal, but the frequency is approximately linear only at the center. Therefore there is blanking out of the signal near the reversal points. However, linearization of the signal is also achieved by linearizing the motion of the grating itself.

Figure 3:
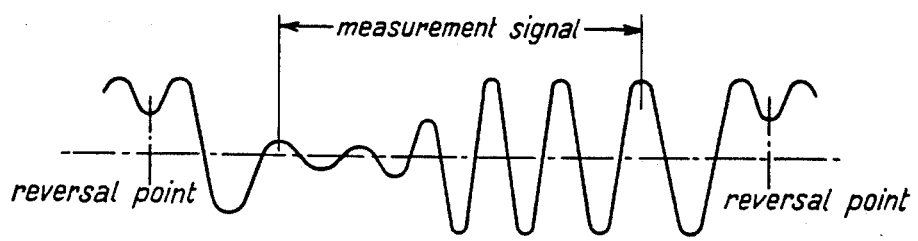
FIG. 3 is a graphical representation of a signal for an object with dark sites.

FIG. 3 on the other hand, shows a signal obtained from a dark site next to bright object site. There is hardly any signal amplitude along part of the oscillation path, immediately next to it (however) there is enough signal amplitude to focus the apparatus. Provided $a >> d$, the dark site therefore is skipped over.

An aperiodic grating may be used in lieu of a periodic one, in which case it is advantageous to analyse the varying spatial frequencies of the image.

In order to determine the direction in which the focusing adjustment is to take place two photodetectors are located at different places in the pupil imaged behind the amplitude grating by a collecting or condensing lens. There is a phase difference between the two signals from the photodetectors if there is lack of focus, the sense and magnitude of this difference being a measure of the degree of defocusing.

When making use of a prismatic grating (in contradistinction to an amplitude grating) two images of the pupil will appear in the image plane of the collecting lens. This requires two sets of two photodetectors, i.e. one set in each pupil image.

By means of a suitable differential circuit the four signals generated by the four photodetectors are processed to produce two phase-shifted signals in case of lack of focus. This method is known as the split-pupil method and is disclosed, for example, in the U.S. Pat. No. 3,856,401.

As regards the oscillating grating proposed herein, the reversal in direction also results in a reversal of the phase shift. It is proposed therefore to make use of an electronic commutator for signal processing. When the grating reverses its motion, a trigger signal from the grating motion then interchanges the signal lines from the two pupil images.

Figure 4:
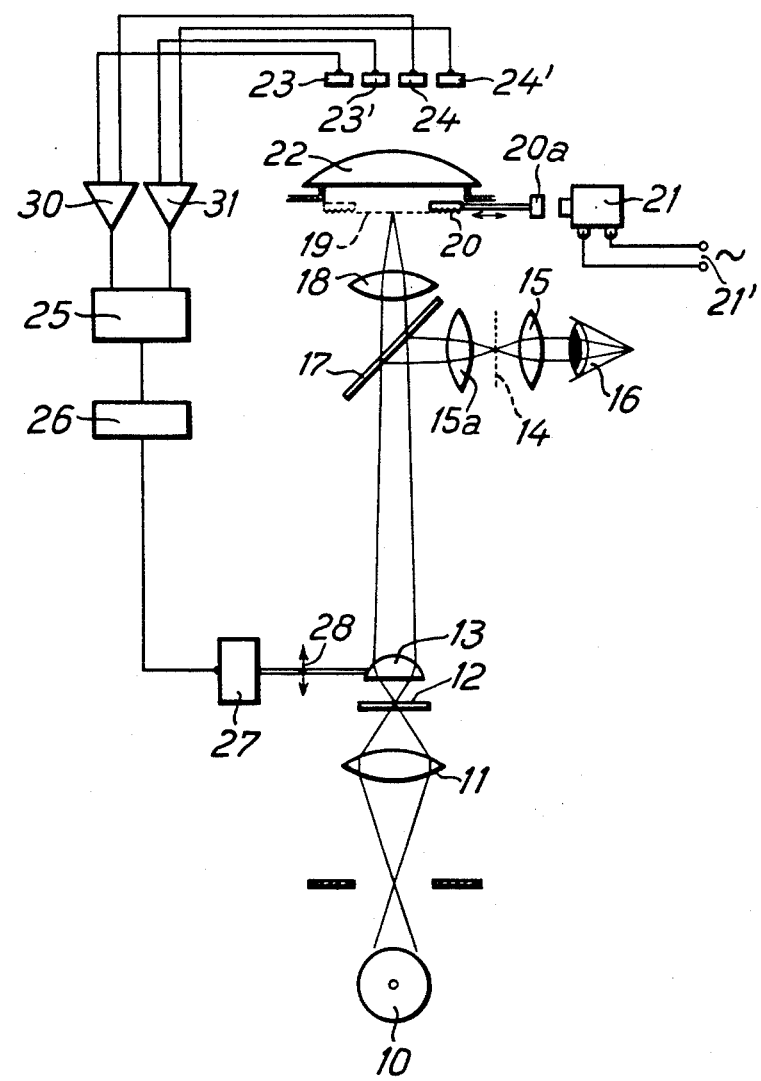
FIG. 4 is a diagrammatic plan view of apparatus for implementing the present method in a microscope.

FIG. 4 shows the apparatus for the implementation of the present method in a microscope. The light source is designated by 10. Objective 13 produces two intermediate images in the planes 14 and 19 via a beam splitter 17 and the lenses 15a and 18. In the plane 14 the intermediate image may be viewed by an observer 16 through an ocular 15 if so desired. In the intermediate image plane 19 a scanning grating 20 of prismatic design is mounted and this grating is displaceable (normal to the incident beam). This displacement takes place by means of an oscillation component 21 and in this instance too, the oscillation excursion is $a >> d$. The oscillating component 21 comprises an electromagnet connected to an A.C. source 21'. To the frame of the grating 20 there is attached a small permanent magnet 20a which is disposed adjacent the electromagnet core. When the latter is connected to the A.C. power the grating undergoes an oscillating movement of the A.C. frequency.

By the prismatic grating 20 and the field lens 22 two images of the pupil of the objective 13 are imaged side by side. In each pupil image there are located two photodetectors each, namely 23; 23' and 24; 24'. The signals generated by the photodetectors 23 and 24 are supplied to a first differential amplifier 30 and the signals generated by the photodetectors 23' and 24' are supplied to a second differential amplifier 31.

In each differential amplifier the two signals are processed in a known manner in such a way that the signals are subtracted from one another, thereby eliminating the D.C. component of the signals and, at the same time, amplifying (doubling) the A.C. component. The two signals carried by the outputs of the amplifiers are fed to a phase sensitive rectifier of known design, which evaluates the phases of the two signals and produces rectified pulses of corresponding amplitudes.

The rectified pulses are supplied to an integrator 26 which forms from the pulses a D.C. signal of appropriate polarity that is fed to a drive motor 27 which moves the objective in the direction of the double arrow 28 for the purpose of automatic focusing.

I claim:
1. In a method for automatically focusing an optical system, comprising locating a grating in the intermediate image plane, said grating defining a spatial frequency filter, associating a photoelectric detection system with said grating, generating electrical control signals which are modulated by the relative motion between an object image and said grating, said motion normal to the longitudinal range of the grating marks, the improvement comprising:
using a grating (2) which is short compared to the range of the intermediate image and generating relative motions extending across several grating constants between said intermediate image (1) and said grating (2).
2. In an apparatus for automatically focusing an optical system comprising a grating defining a spatial frequency filter mounted in an intermediate image plane of the beam of the system being focused and normal to the optical axis and movably to the lengthwise range of the grating marks, associated with at least one receiver comprising photoelectric detectors scanning the light fluxes leaving the grating and converting them into corresponding electrical signals, the improvement comprising:
said grating (20) being short compared with the range of the intermediate image (19) and drive means (21) for the grating motion reciprocating the grating over a plurality of grating constants.

* * * * *